S. WILLIAMS.
Wheat-Drill.

No. 225,545. Patented Mar. 16, 1880.

Witnesses
Nat. E. Oliphant
Geo. R. Porter

Inventor
Sanford Williams
per Chas. H. Fowler
Attorney.

UNITED STATES PATENT OFFICE.

SANFORD WILLIAMS, OF NEAR SEDGWICK, KANSAS.

WHEAT-DRILL.

SPECIFICATION forming part of Letters Patent No. 225,545, dated March 16, 1880.

Application filed January 20, 1880.

*To all whom it may concern:*

Be it known that I, SANFORD WILLIAMS, citizen of the United States, residing near Sedgwick, in the county of Harvey and State of Kansas, have invented certain new and useful Improvements in Wheat-Drills; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention has relation to seed and wheat drills; and it consists in a series of bifurcated cutters having distributers for the seed, said cutters being hinged to a pivoted cross-beam provided with a series of flat springs, in connection with a removable rod passing through the arms of the cutters, and having removable blocks supported by the rod and disposed between the arms of the cutters, upon which the springs bear, the tension of the springs thereon being regulated by a lever connected to the pivoted cross-beam.

Figure 1:
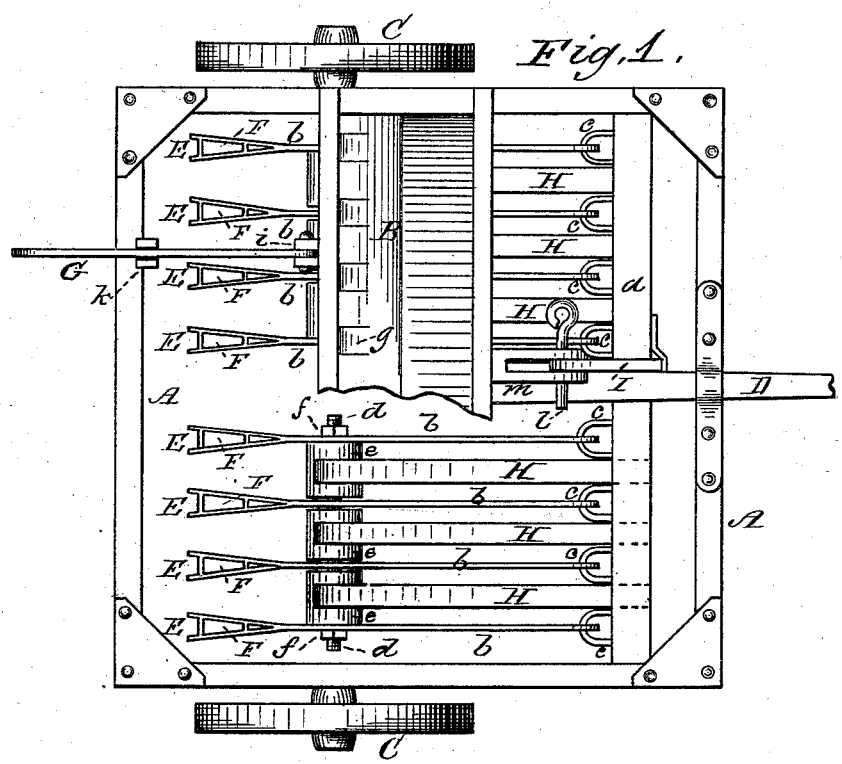
Figure 2:
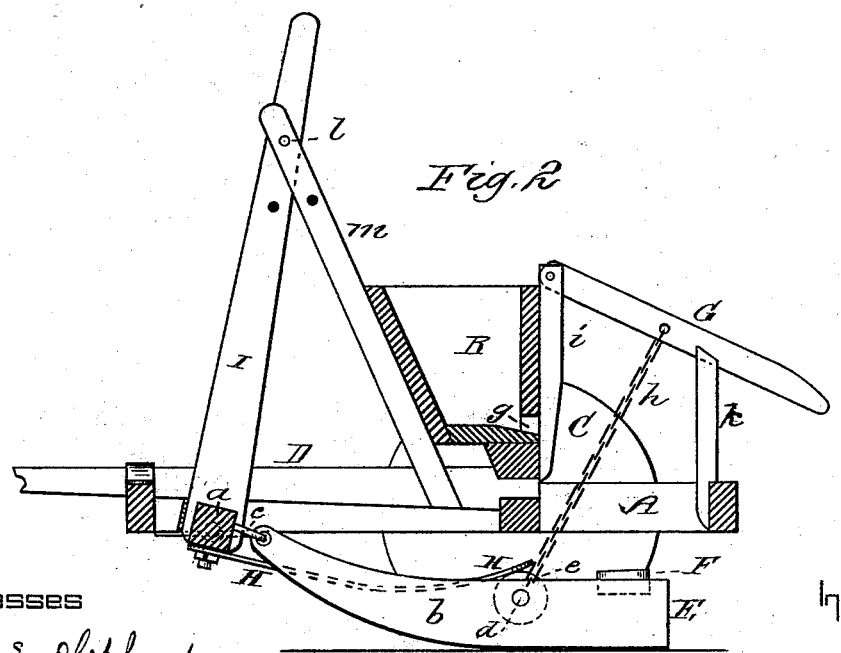

Figure 1 of the drawings is a top-plan view of my invention, and Fig. 2 a longitudinal vertical section of the same.

In the accompanying drawings, A represents the frame, having secured thereto a suitable seed-hopper, B, and wheels C and the usual tongue D. This frame A has secured to it, near its forward end, a cross-beam, $a$, to which the arms $b$ of the cutters E are secured by links $c$, and near their rear ends to a horizontal shaft, $d$. This shaft passes through the arms $b$ and through a series of blocks, $e$, each of which is located between the arms to separate and retain the arms and cutters the proper distance from each other.

When it is desired to have the cutters farther apart or nearer to each other, as circumstances may require, the shaft $d$ is withdrawn by first removing one of the nuts $f$, and a new set of blocks of greater or less width used.

The cutters E are bifurcated, and have between the blades thereof a distributer or chute, F, which receives the seed from the hopper B, said hopper having openings $g$ on a line with the distributers or chutes.

To the shaft or shafts $d$ is secured one end of a cord or chain, $h$, the other end being connected to a lever, G, which is pivoted to cleat $i$, said lever resting within a slot in the end of a post, $k$, secured to the frame A.

By this arrangement the cutters E can be raised or lowered, as found desirable, while at the same time the links $c$ and elasticity of the chains or cords $h$ will allow the cutters to have the required lateral movement.

Secured to the cross-beam $a$ are flat springs H, their rear ends bearing upon the blocks $e$. The beam $a$, to which one end of each spring H is secured, has pivotal bearings in the sides of the frame A, and is provided with a lever, I. By pressing this lever at its upper end in a direction toward the hopper B the tension of the springs is increased by the turning of the beam $a$ in its bearings, thereby increasing the pressure upon the blocks $e$, and retaining the cutters E in the ground, as required by the condition of the soil. The lever is retained at the required height, after adjusting the tension of the springs, by a pin, $l$, passing through the bifurcated end of a beam, $m$, and through a hole in the end of a lever, both the lever and beam being provided with a series of holes for this purpose. The blocks $e$ also act as rollers for the ends of the cutters E, which run easy and light, and their peculiar form will prevent their choking in the weeds and grass.

Having now fully described my invention, what I claim as new, and desire to secure by Letters Patent, is—

In a wheat or grain drill, the bifurcated cutters E and distributers F, said cutters being hinged to a pivoted cross-beam, $a$, having a series of flat springs, H, in combination with the removable rod $d$ and removable blocks or rollers $e$, said springs bearing upon said rollers or blocks, and their tension being regulated by the lever I, substantially as and for the purpose set forth.

In testimony whereof I affix my signature in presence of two witnesses.

SANFORD WILLIAMS.

Witnesses:
S. D. GRIFFITH,
T. J. COOPER.